United States Patent [19]
Bruckmann et al.

[11] Patent Number: 5,949,669
[45] Date of Patent: Sep. 7, 1999

[54] LOW-LOSS POWER CURRENT INVERTER

[75] Inventors: Manfred Bruckmann, Nürnberg; Axel Mertens, Baiersdorf, both of Germany

[73] Assignee: Siemens Aktiengesellschaft, München, Germany

[21] Appl. No.: 09/043,497

[22] PCT Filed: Sep. 17, 1996

[86] PCT No.: PCT/DE96/01754

§ 371 Date: Jun. 19, 1998

§ 102(e) Date: Jun. 19, 1998

[87] PCT Pub. No.: WO97/13315

PCT Pub. Date: Apr. 10, 1997

[30] Foreign Application Priority Data

Sep. 29, 1995 [DE] Germany ............... 195 36 470

[51] Int. Cl.⁶ .............. H02M 7/5387; H02M 5/21
[52] U.S. Cl. .............. 363/132; 363/136; 363/98
[58] Field of Search .................... 363/136, 132, 363/98, 131, 43, 17, 95, 37

[56] References Cited

U.S. PATENT DOCUMENTS

| | | | |
|---|---|---|---|
| 4,203,151 | 5/1980 | Baker ....................................... | 363/132 |
| 4,523,269 | 6/1985 | Baker et al. ............................. | 363/138 |
| 4,881,159 | 11/1989 | Holtz et al. ............................. | 363/137 |

FOREIGN PATENT DOCUMENTS

| | | |
|---|---|---|
| 0 727 870 | 8/1996 | European Pat. Off. .. |
| 0 250 719 | 1/1998 | European Pat. Off. .. |
| 38 31 126 | 3/1990 | Germany . |
| 40 42 001 | 7/1992 | Germany . |
| 41 35 870 | 1/1993 | Germany . |

OTHER PUBLICATIONS

"Novel Snubberless Three–Level GTO Inverter with Dual Quasi-Resonant DC–link," Wan Yi et al., 24th Annual IEEE Power Electronics Specialists Conference, Seattle, Jun. 20–25, 1993, pp. 880–884.

"Wide Load Range Three–Level ZVS–PWM DC–to–DC Converter," J. Renes Pinheiro et. al., 24th Annual IEEE Power Electronics Specialists Conference, Seattle, Jun. 20–25, 1993, pp. 171–177.

"The Auxillary Resonant Commutated Pole Conveter," R. W. De Doncker et al., IEEE–IAS Conference Proceedings, 1990, pp. 1228–1235.

"Series Connection of IGBTs in Resonant Converters," M. Dehmlow et al., IPEC–Yokohama, 1995, pp. 1634–1638.

"The Auxiliary Quasi–Resonant DC Link Inverter," R. W. De Doncker et al., IEEE Power Electronics Specialists Conference, 1991, pp. 248–253.

"Soft–switching Power Conversion," J. B. Klaassens et al., EPE Journal, vol. 3, No. 3, Sep. 1993, pp. 155–166.

"A Low–expenditure Thyristor Three–Level Inverter with Small Lossess," B. Fuld, vol. 11, No. 8, 1989, pp. 261–265.

"Principles for the Development of a Control Process for GTO–Three Step Inverters for Traction Drives," J. K. Steinke, vol. 10, No. 7, 1988, pp. 215–220.

*Primary Examiner*—Peter S. Wong
*Assistant Examiner*—Rajnikant B. Patel
*Attorney, Agent, or Firm*—Kenyon & Kenyon

[57] ABSTRACT

A low-loss power inverter is provided. Each inverter phase includes an upper and a lower bridge half, each having two power semiconductor switches, with antiparallel-connected diodes, with one tie point of the power semiconductor switches being connected using an isolating diode to a tie point of a d.c. intermediate circuit, an auxiliary circuit consisting of an upper and a lower auxiliary switch and a resonant inductor is provided, and at least one resonant capacitor is provided for power semiconductor switches of the inverter phase. This yields a low-loss power inverter which combines the advantages of a three-point inverter with those of an ARCP inverter.

17 Claims, 4 Drawing Sheets

LOW-LOSS POWER CURRENT INVERTER

FIELD OF THE INVENTION

The present invention relates to a low-loss power inverter.

BACKGROUND INFORMATION

For many years, resonant power converters have been increasingly used for drive engineering as an alternative to a conventional the traditional voltage-applying pulse-width-modulation inverters. Their purpose is to drastically reduce switching losses and optimally utilize the ensuing advantages—higher power density and higher operating frequency. Furthermore, semiconductors can switch higher currents because of the lower load during switching operations, thus permitting higher utilization of capacity.

Disadvantages include, in some cases, a considerable increased expense for active and passive components which must be added to shape the voltage and current characteristics appropriately during switching operations. In some cases higher peak currents and voltages occur on the switching elements. Additionally, completely different control methods than in the past must be used in some resonant power converters.

A power converter having only minor restrictions compared to other circuits is known as an auxiliary resonant commuted-pole (ARCP) power converter. In an ARCP power converter, the peak loads that occur on the switching elements are not higher than in a pulse-width-modulation inverter, and the conventional control methods can be used and need only be adapted with regard to dead times and minimum pulse periods. The increased expense in terms of components and control electronics is moderate and must be considered in relation to the advantages that can be achieved, optionally also in comparison with traditional balancing networks.

An article entitled "The auxiliary resonant commutated pole converter" by R. W. De Doncker et al., *IEEE-IAS Conference Proceedings* 1990, pp. 1228–35, describes an operation of an ARCP converter. In such an ARCP converter, a resonant capacitor is connected in parallel with each power semiconductor switch. Furthermore, an auxiliary circuit including an auxiliary switch which is connected in series with a resonant inductor is provided, connecting a neutral point of an indirect d.c. link capacitor to an output terminal of the converter phase. Two semiconductor switches with antiparallel diodes are provided as auxiliary switches; they are connected in series so that their cathodes, emitters and source terminals are linked together. The semiconductor switches used may be SCRs (symmetrically blocking thyristors), GTOs (gate turn-off thyristors), ZTOs or MCTs (MOS-controlled thyristors). The power semiconductor switches provided may be GTOs (gate turn-off thyristors), MCTs (MOS-controlled thyristors), IGBTs (insulated gate bipolar transistors) or PTRs (power transistors).

When power is to be supplied to high-power three-phase loads, e.g., three-phase machines in the MW range using self-commutated rectifiers, phase-to-phase voltage in the high-voltage range is demanded. To meet this demand at the current level of semiconductor technology, semiconductor components may have to be connected in series.

An article entitled "Series connection of IGBTs in resonant converters," by M. Dehmlow et al., *IPEC Yokohama* '95, pp. 1634–38, describes a resonant converter. Each of the resonant converter's, bridge branch valves includes a series connection of three IGBTs. Each power switch is provided with a resonant capacitor.

The expanded three-phase bridge connection is an advantageous option for a series connection of two components per bridge branch. With this circuit, the voltage of the a.c. terminals with respect to terminal 0 may assume the three values $+U_d/2$, zero, and $-U_d/2$. Therefore, this is also called a self-commutated three-point power converter or three-point power inverter.

SUMMARY OF THE INVENTION

An object of the present invention is to create a power inverter with low-loss switching of its power semiconductor switches.

A design of a three-point inverter phase is obtained due to the fact that for each inverter phase connected in parallel with a d.c. intermediate circuit including a series connection of two capacitors, an upper and a lower bridge half each has two power semiconductor switches whose tie points are each connected to the tie point of the two capacitors of the d.c. intermediate circuit by means of an isolating diode. This three-point inverter phase is provided with additional components. These additional components include an auxiliary circuit and, for the power semiconductor switches of the inverter phase, at least one resonant capacitor. The auxiliary circuit includes an auxiliary switch for the upper and lower bridge halves of the inverter phase, which is series-connected with a resonant inductor. This auxiliary circuit connects an output terminal of the inverter phase to a center terminal of the two capacitors of the d.c. intermediate circuit. One terminal of an auxiliary switch is connected to one center terminal of a capacitor of the d.c. intermediate circuit, and one terminal of the resonant inductor is connected to the output terminal of the inverter phase.

Using these auxiliary switches, the resonant circuit (resonant inductor and at least one resonant capacitor) can be turned on and off. It is thus possible to set the switching instant of the power semiconductor switches of the inverter phase, so that traditional pulse width modulation methods can be used. Therefore, the power semiconductors of this inverter phase can switch on and off at a negligible voltage across these components (zero voltage switch (ZVS) principle). The auxiliary switches of this auxiliary circuit are also operated with a reduced load on the switches according to the zero current switch (ZCS) principle. In the ZCS principle, the auxiliary switch is switched on and off at a negligible current. In other words, this is low-loss switching of the semiconductor switches used in this inverter phase.

This yields a three-point ARCP inverter as a low-loss power inverter, which combines the advantages of a three-point inverter with those of an ARCP inverter, with a minimum of only one resonant capacitor being needed.

In an advantageous exemplary embodiment of an inverter phase of the low-loss power inverter, two resonant inductors instead of one, each series-connected with an auxiliary switch, are provided in the auxiliary circuit.

DETAILED DESCRIPTION OF THE INVENTION

Figure 1:
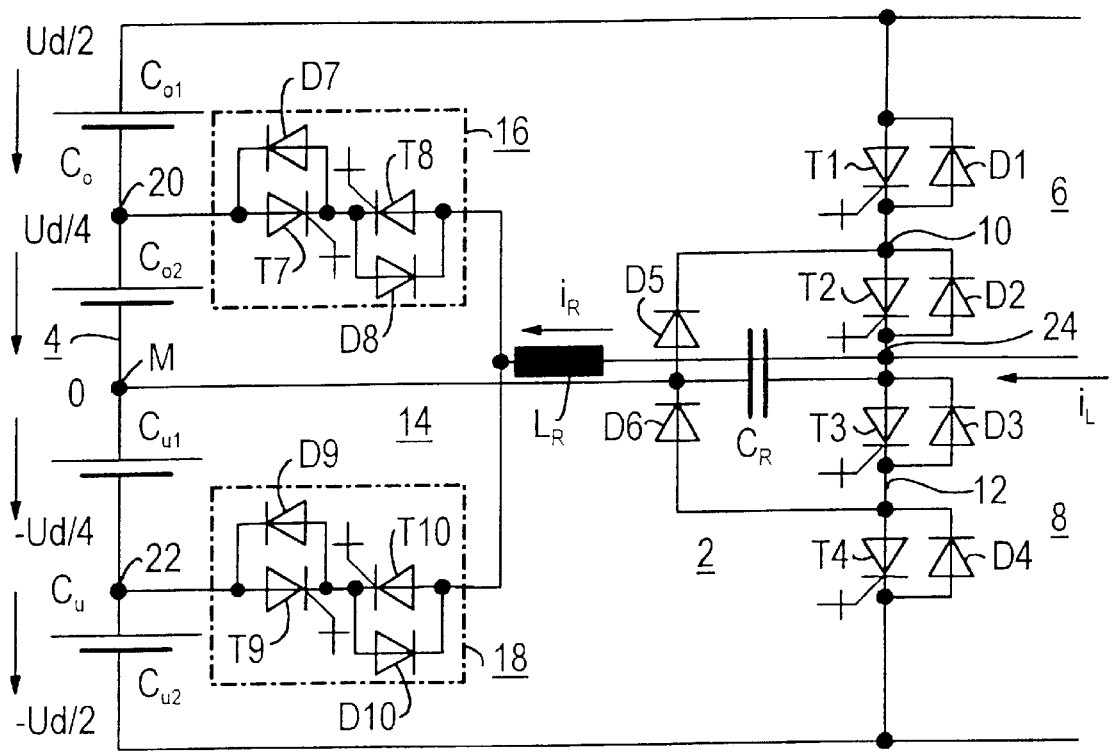
FIG. 1 shows a first exemplary embodiment of an inverter phase of a low-loss power inverter according to the present invention.

FIG. 1 shows the design of an inverter phase 2 of a low-loss power inverter, with this inverter phase 2 connected in parallel with a d.c. intermediate circuit 4. Inverter phase 2 has upper and lower bridge halves 6 and 8, each having two power semiconductor switches T1, T2 and T3, T4 with antiparallel connected diodes D1, D2 and D3, D4. Tie points 10 and 12 of power semiconductors T1, T2 and T3, T4 are connected by an isolating diode D5 or D6 to a tie point M of the two capacitors CO and CU of d.c. intermediate circuit 4.

The two capacitors $C_o$ and $C_u$ of d.c. intermediate circuit 4 are each divided into two capacitors $C_{o1}$, $C_{o2}$ and $C_{u1}$, $C_{u2}$ of the same size whose capacitance values are twice as great as the capacitance value of capacitors $C_o$ or $C_u$ of d.c. intermediate circuit 4. A capacitor with center tapping may also be provided as capacitor $C_o$ or $C_u$ of d.c. intermediate circuit 4.

Furthermore, this inverter phase 2 has an auxiliary circuit 14 including of an upper and a lower auxiliary switch 16 and 18 and a resonant inductor $L_R$. These two auxiliary switches 16 and 18 are series-connected to resonant inductor $L_R$. Auxiliary switches 16 and 18 each include two semiconductor switches T7, T8 and T9, T10 with antiparallel connected diodes D7, D8 and D9, D10. Using means of this auxiliary switch 16 or 18, a tie point 20 or 22 of capacitors $C_{o1}$, $C_{o2}$ and $C_{u1}$, $Cu_{u2}$ of d.c. intermediate circuit 4 can be connected to an output terminal 24 of inverter phase 2 across resonant inductor $L_R$.

Furthermore, at least one resonant capacitor $C_R$ is provided for power semiconductor switches T1, . . . , T4 of inverter phase 2, which is connected between output terminal 24 of inverter phase 2 and tie point M of d.c. intermediate circuit 4.

Switched power semiconductor switches, e.g., GTOs, MCTs, IGBTs or PTRs, are provided as power semiconductor switches T1, . . . , T4 of inverter phase 2, with GTOs shown here as an example. SCRs, GTOs, ZTOs or MCTs are used as semiconductor switches T7, . . . , T10 of auxiliary switches 16, with GTOs shown here as an example.

Figure 2:
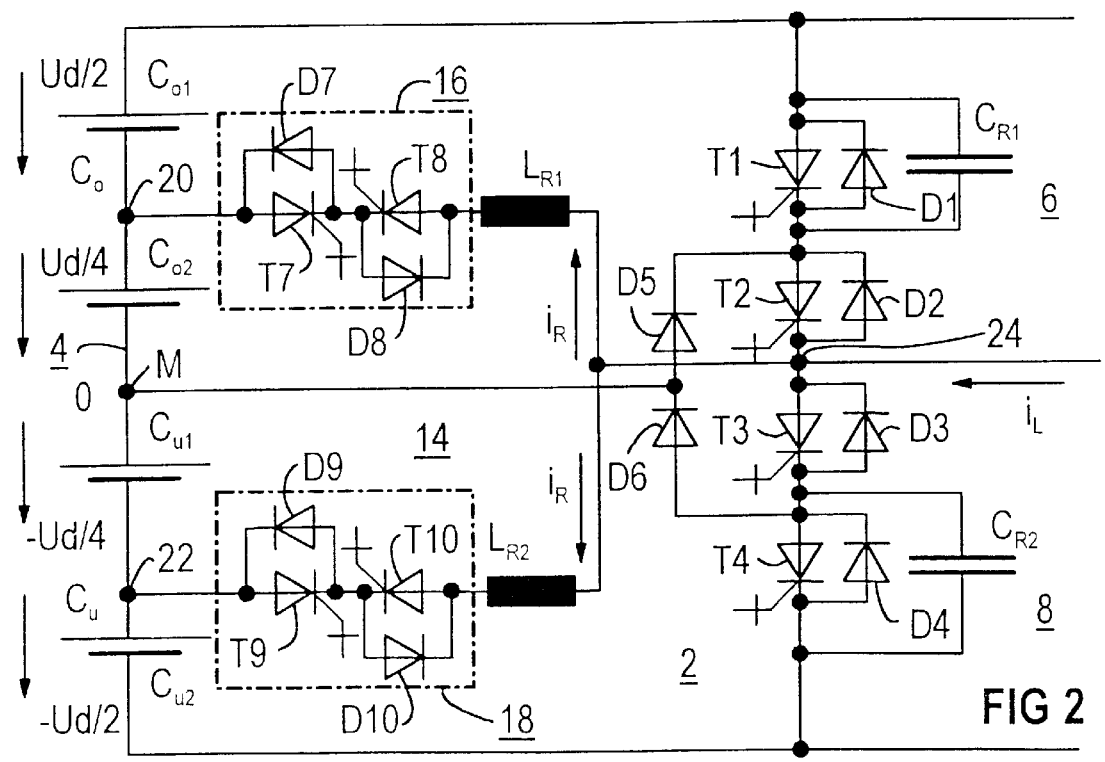
FIG. 2 shows an advantageous exemplary embodiment of the inverter phase.

FIG. 2 shows an advantageous exemplary embodiment of inverter phase 2, with the same components being provided with the same reference notation as that used in FIG. 1. In comparison with the exemplary embodiment according to FIG. 1, two resonant inductors $L_{R1}$ and $L_{R2}$ are provided instead of one resonant inductor $L_R$. These two resonant inductors $L_{R1}$ and $L_{R2}$ are each series-connected with an auxiliary switch 16 or 18. Furthermore, in comparison with the exemplary embodiment of inverter phase 2, two resonant capacitors $C_{R1}$ and $C_{R2}$ are provided instead of one resonant capacitor $C_R$. The two resonant inductors $L_{R1}$ and $L_{R2}$ may also be combined with the resonant capacitor $C_R$ according to FIG. 1.

Figure 3:
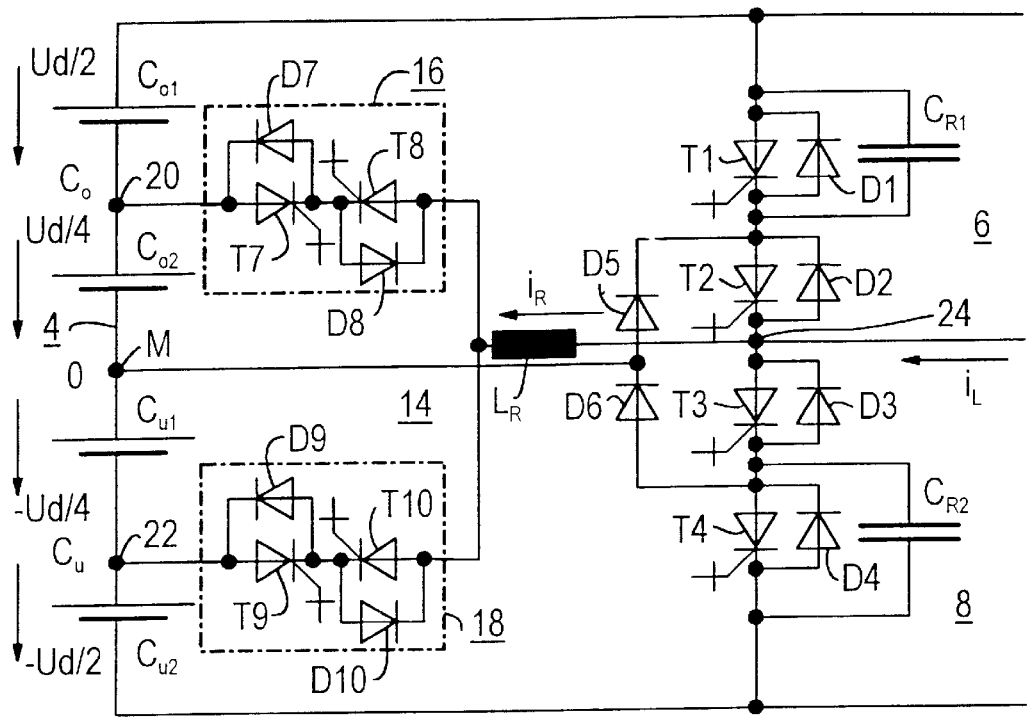
FIG. 3 shows another exemplary embodiment of the inverter phase.

The exemplary embodiment of inverter phase 2 according to FIG. 3 differs from the exemplary embodiment according to FIG. 1 in that two resonant capacitors $C_{R1}$ and $C_{R2}$ are provided instead of one resonant capacitor $C_R$. These two resonant capacitors $C_{R1}$ and $C_{R2}$ are each connected in parallel with an external power semiconductor switch T1 and T4 of upper and lower bridge halves 6 and 8. Otherwise, this exemplary embodiment is the same as that according to FIG. 1.

Figure 4:
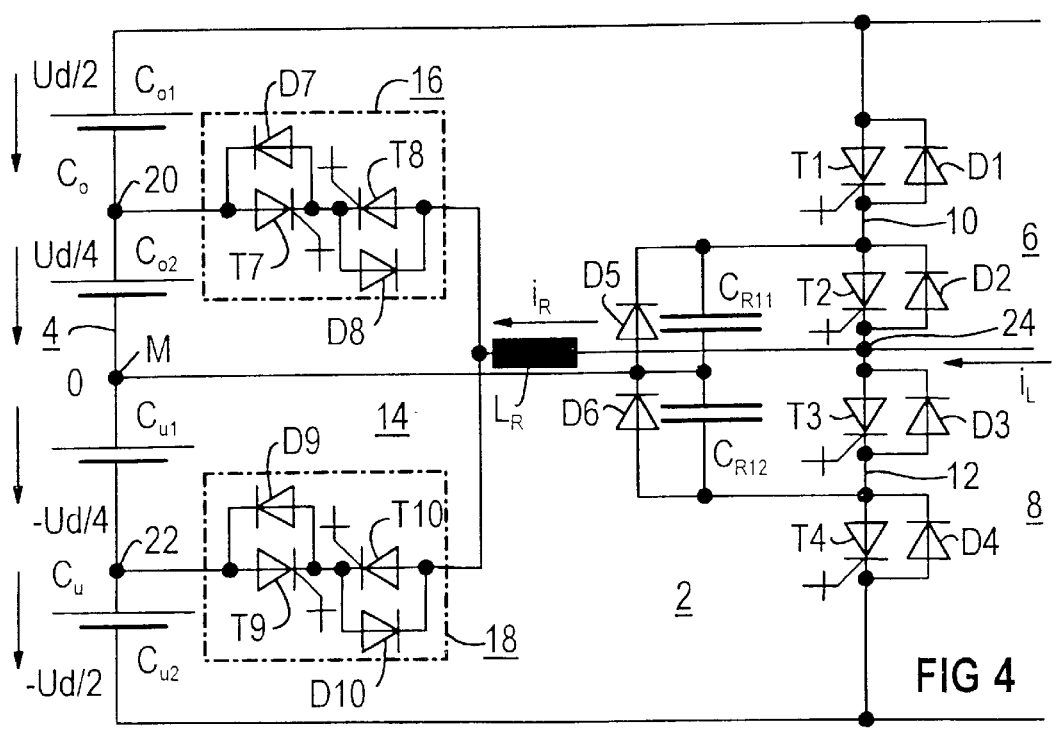
FIG. 4 shows yet another exemplary embodiment of the inverter phase.

The exemplary embodiment of inverter phase 2 according to FIG. 4 differs from the exemplary embodiment according to FIG. 1 in that two resonant capacitors $C_{R11}$ and $C_{R12}$ are provided instead of one resonant capacitor $C_R$. Resonant capacitor $C_{R11}$ or $C_{12}$ is arranged between tie point 10 or 12 of upper and lower power semiconductor switches T1, T2 and T3, T4 and tie point M of the two capacitors $C_o$ and $C_u$ of d.c. intermediate circuit 4. Otherwise, this exemplary embodiment is the same as that according to FIG. 1.

Figure 5:
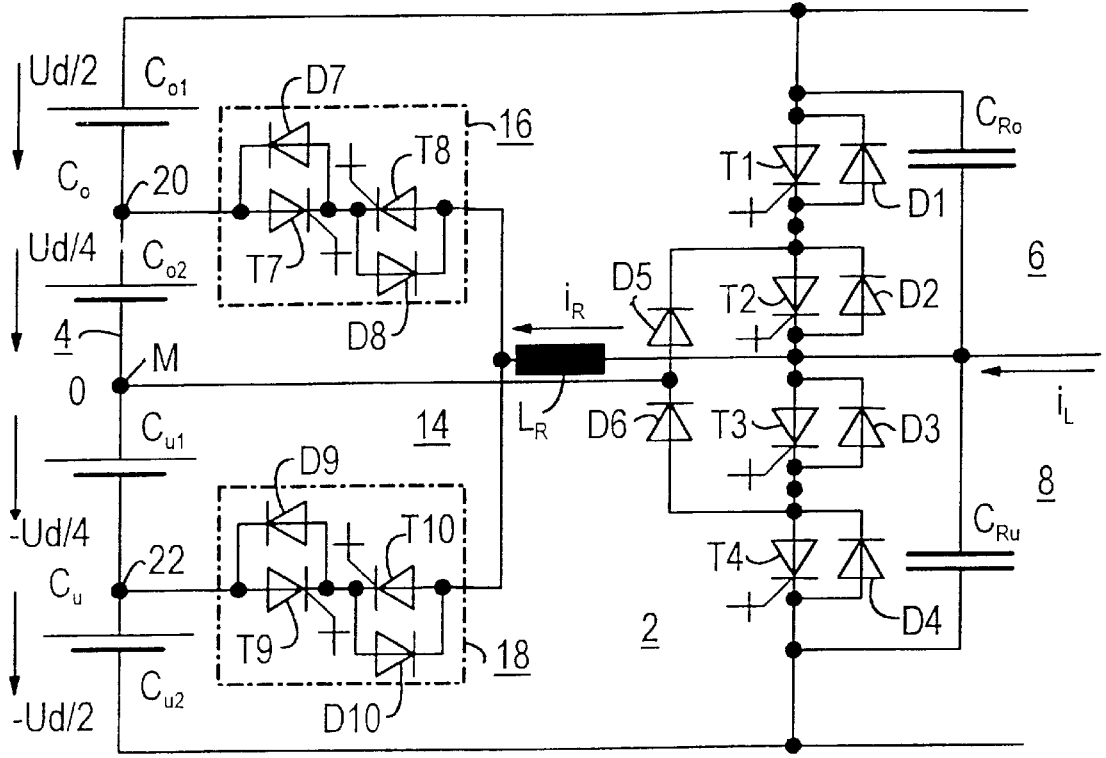
FIG. 5 shows a further exemplary embodiment of the inverter phase.

The exemplary embodiment of inverter phase 2 according to FIG. 5 differs from the exemplary embodiment according to FIG. 1 in that two resonant capacitors $C_{Ro}$ and $C_{Ru}$ are provided instead of one resonant capacitors $C_R$. Resonant capacitor $C_{Ro}$ and $C_{Ru}$ is connected in parallel with power semiconductor switches T1, T2 and T3, T4 of the upper and lower bridge halves 6 and 8. Otherwise, this exemplary embodiment is the same as that according to FIG. 1.

Figure 6:
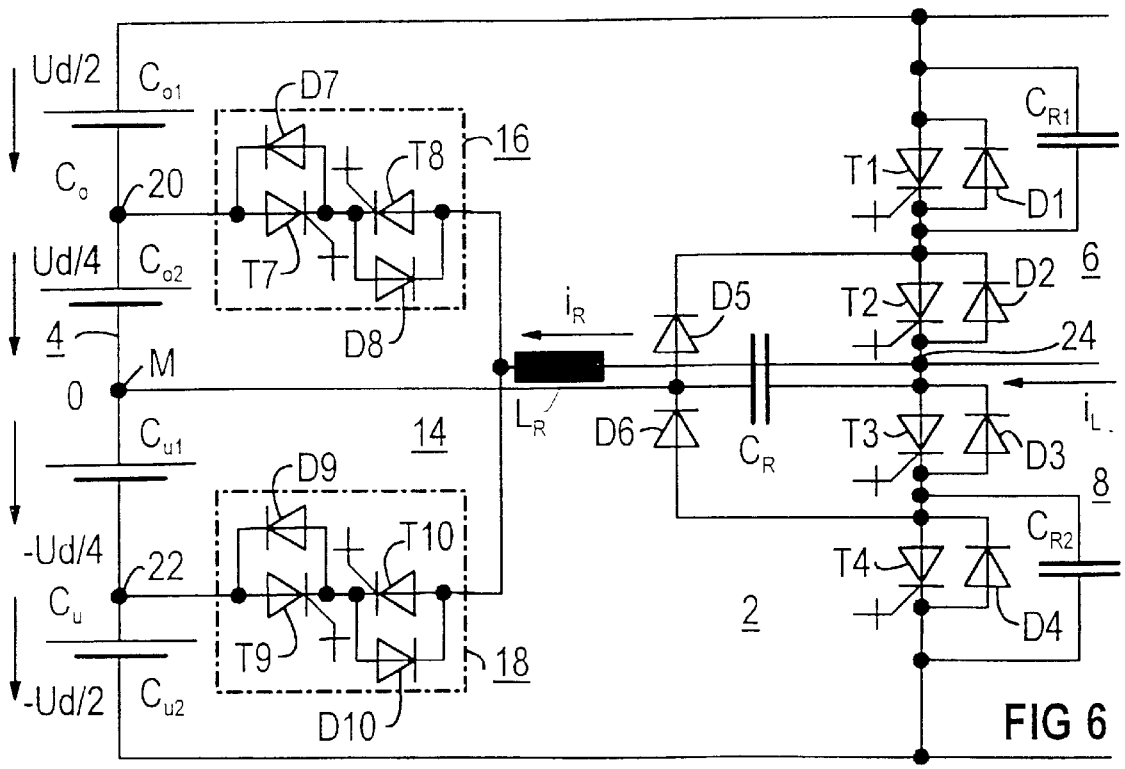
FIG. 6 shows an exemplary embodiment of the inverter phase which combines the exemplary embodiments according to FIGS. 1 and 3.
Figure 7:
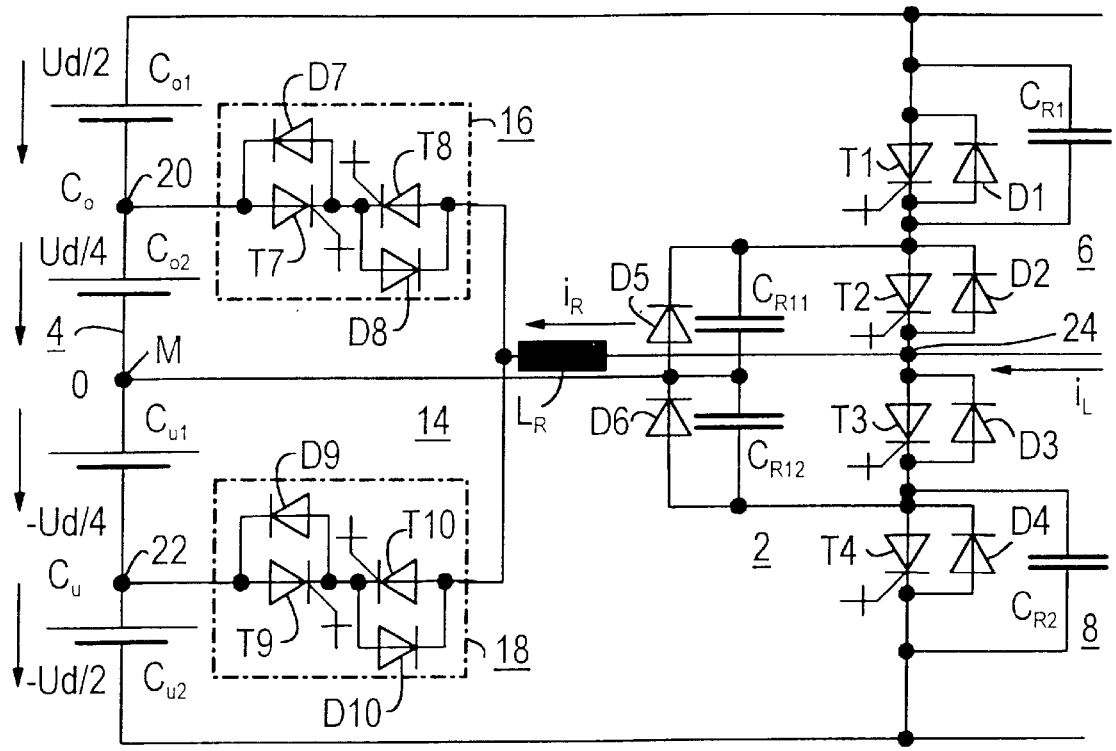
FIG. 7 shows an exemplary embodiment including the embodiments from FIGS. 3 and 4.
Figure 8:
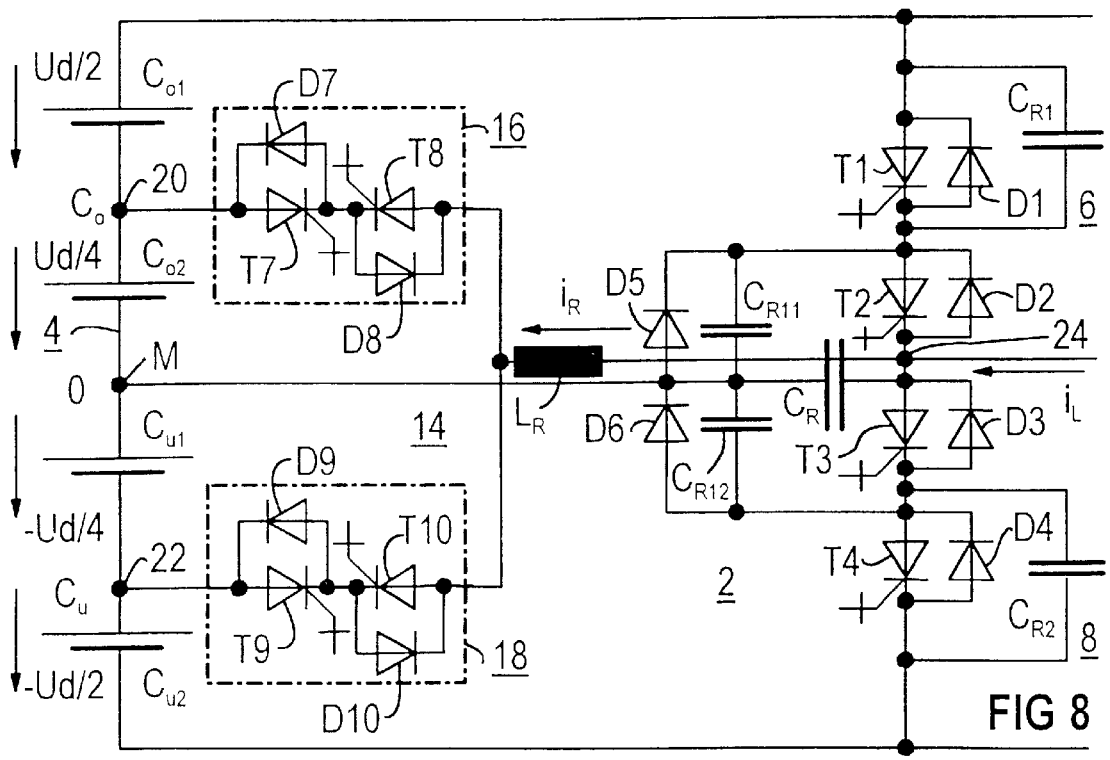
FIG. 8 shows an exemplary embodiment of the inverter phase which combines the embodiments according to FIGS. 1, 3 and 4.

The exemplary embodiment of inverter phase 2 according to FIG. 6 is a combination of the exemplary embodiments according to FIGS. 1 and 3, whereas the exemplary embodiment of inverter phase 2 according to FIG. 7 is a combination of the exemplary embodiments according to FIGS. 3 and 4, and the exemplary embodiment of inverter phase 2 according to FIG. 8 is a combination of the exemplary embodiments according to FIGS. 1, 3, and 4.

The exemplary embodiment of inverter phase 2 according to FIGS. 1 and 3 through 8 each have only one resonant inductor $L_R$. Instead of this one resonant inductor $L_R$, these exemplary embodiments of inverter phase 2 according to FIGS. 1 and 3 through 8 may also have two resonant inductors $L_{R1}$ and $L_{R2}$, as shown in FIG. 2.

The operation of inverter phase 2 according to FIG. 3 of the low-loss power inverter according to the present invention is described below on the basis of the commutation processes from the lower semiconductor switches T3 and T4 to the upper power semiconductor switches T1, D1 and T2, D2 (see section B, below) and back (see section B, below). It is assumed here that load current $i_L$ flows over power semiconductor switches T3 and T4 in the direction of inverter phase 2. To permit a polarity reversal process, different voltages must be generated by tie point M of d.c. intermediate circuit 4 (here, for example, by forming ¼ $U_d$, ¾ $U_d$ with additional division of capacitors $C_o$ and $C_u$ of d.c. intermediate circuit 4). These voltages can be switched to resonant inductor $L_R$ over auxiliary switches 16 and 18 and thus act as current sources at the neutral point.

Section A) Change of the Phase Output Voltage from Potential $-U_d/2$ to Potential $+U_d/2$ 1) Switching off power semiconductor switch T4:

Since load current $i_L$ flows in the direction of inverter phase 2, power semiconductor switches T3 and T4 carry the current. Resonant capacitor $C_{R2}$ is discharged, and resonant capacitor $C_{R1}$ is charged to $+U_d/2$. Auxiliary switch 18 is switched on at a negligible current (zero current switching) and thus at low loss, so that a positive current builds up in resonant inductor $L_R$ due to the addition of ¼ $U_d$ and is superimposed on load current $i_L$ carried by power semiconductor switches T3 and T4. As soon as the sum of currents $i_L$ and $i_R$ (current due to resonant inductor $L_R$) is large enough to achieve the design operating speed, power semiconductor T4 is switched off under zero voltage and thus at low loss (zero voltage switching). The total current commutates in parallel resonant capacitor $C_{R2}$. As soon as the voltage on power semiconductor switch T4 has reached the value $+U_d/2$, isolating diode D6 begins to conduct, so output terminal 24 of inverter phase 2 is connected to tie point M of d.c. intermediate circuit 4. The sum of currents $i_R$ and $i_L$ is carried over power semiconductor switch T3 and isolating diode D6. Current $i_R$ in resonant inductor $L_R$ can now drop against voltage ¼ $U_d$ over auxiliary circuit switch 18, resonant inductor $L_R$, power semiconductor switch T3 and isolating diode D6. For this period of time, no further commutation should be allowed in inverter phase 2, because otherwise auxiliary switch 18 would have to switch off and auxiliary switch 16 would have to switch on. This can no longer be done as a no-loss operation (zero current switching) for auxiliary switches 16 and 18, and instead any overvoltages occurring would endanger the switching elements. Next, power semiconductor switch T2 is switched on with no loss. Thus, the proper path is created for the case of zero crossing of the current.

If load current $i_L$ is large enough to permit automatic and sufficiently rapid reversal of the voltage polarity, triggering of auxiliary switch 18 may be omitted, and power semiconductor switch T4 is switched off immediately. Here, losses in power semiconductor switches T4 and T3 and auxiliary switches 16 and 18 are eliminated. The remaining process takes place by analogy with the process described above.

2a) Switching off power semiconductor switch T3 (load current $i_L$ maintains the same orientation):

After resonant inductor $L_R$ is currentless, auxiliary switch 16 can be switched on with no loss (zero current switching). Resonant inductor $L_R$ is magnetized at voltage ¼ $U_d$. As soon as the total current $i_L$ and $i_R$ is great enough, power semiconductor switch T3 is switched off. The current commutates over diode D2 to resonant capacitor $C_{R1}$ which is parallel to power semiconductor switch T1 and is now discharged from $+U_d/2$ to zero. Then power semiconductor switch T1 is switched on at no loss (zero voltage switching), the valve voltage of power semiconductor switch T3 swings to the value of $U_d/2$, resulting in voltage $U_d/2$ at output terminal 24 of inverter phase 2. Resonant inductor $L_R$ is demagnetized against $-¼ U_d$. Here again, auxiliary switch 16 cannot be switched off until resonant inductor $L_R$ is demagnetized.

If the current is great enough to permit automatic and sufficiently rapid reversal of the voltage polarity, then triggering of auxiliary switch 16 can be omitted and power semiconductor switch T3 is switched off immediately. Here, losses in power semiconductor switch T3 and auxiliary switch 16 are eliminated.

2b) Switching off power semiconductor switch T3 (load current $i_L$ changes polarity):

Due to the zero crossing of current $i_L$, load current $i_L$ is carried over the path of isolating diode D5 and power semiconductor switch T2. After resonant inductor $L_R$ is currentless, auxiliary switch 16 is switched on at no loss (zero current switching). Resonant inductor $L_R$ is magnetized at voltage ¼ $U_d$, so the load current $i_L$ is then commutated to the current path of auxiliary switch 16 and resonant inductor $L_R$. Isolating diode D5 and power semiconductor switch T2 are thus currentless. Current $i_R$ which is additionally introduced through auxiliary switch 16 and resonant inductor $L_R$ is carried over power semiconductor switch T3 and isolating diode D6. As soon as the current difference $i_R-i_L$ is large enough, power semiconductor switch T3 is switched off. The current commutates over diode D2 to resonant capacitor $C_{R1}$ which is parallel to power semiconductor switch T1; capacitor $C_{R1}$ is now discharged from $+U_d/2$ to zero. Then power semiconductor switch T1 is switched on at no loss (zero voltage switching). The voltage on power semiconductor switch T3 swings to the value $U_d/2$, so that voltage $U_d/2$ is applied at output terminal 24 of inverter phase 2. Resonant inductor $L_R$ is demagnetized against $-¼ U_d$. Here again, auxiliary switch 16 cannot be switched off until resonant inductor $L_R$ is demagnetized. Shutdown of power semiconductor T1 and T3 takes place by a method similar to that of power semiconductor switches T3 and T4 described above.

3) Rapid commutation:

Certain minimum dwell states $\pm U_d/2$ and zero result from the demagnetization times; under certain circumstances they are undesirable and can be avoided by rapid commutation from $-U_d/2$ to $+U_d/2$. The commutation process can take place by triggering of auxiliary switch 16 as well as auxiliary switch 18, with the magnetization time (or current $i_R$) being selected somewhat longer than the standard commutation time by operating auxiliary switch 18. In this method, first power semiconductor switch T4 is switched off as soon as the sum of currents $i_L$ and $i_R$ has exceeded a certain tripping limit. Total current $i_L$ and $i_R$ commutates into resonant capacitor $C_{R2}$ parallel to power semiconductor switch T4. As soon as the voltage on power semiconductor switch T4 has reached a value of $+U_d/2$, isolating diode D6 begins to conduct, so a zero voltage is applied at output terminal 24 of inverter phase 2. The sum of currents $i_L$ and $i_R$ is carried over power semiconductor switch T3 and isolating diode D6.

Then power semiconductor switch T3 is switched off, so current $i_L$ and $i_R$ commutates over diode D2 to the resonant capacitor $C_{R1}$ which is parallel to power semiconductor switch T1 and is now discharged from $+U_d/2$ to zero. Then power semiconductor switches T1 and T2 are turned on at no loss. Resonant current $i_R$ is demagnetized, and diodes D1 and D2 carry load current $i_L$.

Section B) Change of Phase Output Voltage From Potential $+U_d/2$ to Potential $-U_d/2$ 1) Switching off antiparallel-connected diode D1:

Current $i_L$ plus $i_R$ is flowing at the moment over antiparallel-connected diodes D1 and D2. To commutate these diodes D1 and D2, load current $i_L$ is routed to resonant inductor $L_R$ and an additional current $i_R-i_L$ is routed to power semiconductor switches T1 and T2. This is initiated by triggering auxiliary switch 16. Current $i_R$ increases above the value of $i_L$ until the energy needed for the polarity reversal process has been stored in resonant inductor $L_R$. As soon as this state has been reached, power semiconductor switch T1 switches off and resonant capacitor $C_{R1}$ is recharged by the excess current $(i_R-i_L)$ in resonant inductor $L_R$, so that power semiconductor switch T1 receives voltage $U_d/2$. Resonant inductor $L_R$ is demagnetized over a circuit consisting of isolating diode D5, power semiconductor switch T2, $-U_d/4$ and resonant inductor $L_R$. During this period of time, power semiconductor switch T3 is switched on at no loss at a negligible voltage. Load current $i_L$ can then be carried over power semiconductor switch T3, isolating diode D6 and tie point M.

2a) Connecting voltage $-U_d/2$ to output terminal 24 of inverter phase 2 (current has not changed polarity):

To do so, auxiliary switch 18 must be switched on, load current $i_L$ commutated to the branch with resonant inductor $L_R$, auxiliary switch 18 and $-¼ U_d$. Current $i_R$ in resonant inductor $L_R$ increases until load current $i_L$ as well as the energy (supplied over isolating diode D5 and power semiconductor switch T2) needed for reversal of polarity is achieved. Then power semiconductor switch T2 is switched off at no loss and takes up voltage. At voltage zero, power semiconductor switch T4 is switched on at no loss because diodes D3 and D4 are carrying resonant current $i_R$. Resonant inductor $L_R$ is demagnetized against voltage $U_d/4$.

2b) Connecting voltage $-U_d/2$ to output terminal 24 of inverter phase 2 (current has changed polarity):

Load current $i_L$ is carried over isolating diode D5 and power semiconductor switch T2. The orientation of current $i_L$ is more favorable in this case than with the commutation process described above after a change in polarity. Auxiliary switch 18 is switched on a no loss. An additional current is superimposed on the current through isolating diode D5 and power semiconductor switch T2 until reaching the energy level required for reversal of polarity. Then power semiconductor switch T2 is switched off at no loss and takes up voltage. At voltage zero, power semiconductor switch T4 is switched on at no loss because diodes D3 and D4 are carrying resonant current $i_R$. Resonant inductor $L_R$ is demagnetized against voltage $U_d/4$.

3) Rapid diode commutation:

Like power semiconductor switches T1, . . . , T4, a rapid transition from voltage $+U_d/2$ to $-U_d/2$ is possible with free-wheeling diodes. After resonant inductor $L_R$ has been suitably biased by connecting auxiliary switch 16 or 18 (load current $i_L$ is commutated into the auxiliary branch as with free-wheeling diodes), power semiconductor switch T1 is first switched off as soon as the difference between load current $i_L$ and resonant current $i_R$ has exceeded a certain tripping limit. As a rule, the tripping limit is set higher than in standard commutation. The excess current commutates into resonant capacitor $C_{R1}$ which is parallel to power semiconductor switch T1. As soon as the voltage on power semiconductor switch T1 has reached the value $+U_d/2$, isolating diode D5 begins to conduct, so that voltage zero is applied at output terminal 24 of inverter phase 2. The difference between resonant current $i_R$ and load current $i_L$ is carried over power semiconductor switch T2 and isolating diode D5. Then power semiconductor switch T2 is switched off, the current is commutated over diode D3 to resonant capacitor $C_{R2}$ which is parallel to power semiconductor switch T4; resonant capacitor $C_{R2}$ is now discharged from $+U_d/2$ to zero. At voltage zero, power semiconductor switches T3 and T4 are switched on at no loss, because diodes D3 and D4 carry resonant $i_R$. Resonant inductor $L_R$ is demagnetized.

Instead of the overlapping mode of operation described above (the conducting periods of auxiliary switches 16 and 18 and of power semiconductor switches T1, . . . , T4 to be switched off overlap), a mode without overlapping conducting periods can also be set. For the power inverter according to the present invention, this alternative mode of operation is explained in greater detail below on the basis of commutation processes from the lower power semiconductor switches T3, T4 to the upper power semiconductor switches T1, D1 and T2, D2 of inverter phase 2 of the low-loss power inverter.

This is again based on inverter phase 2 according to FIG. 3.

It is assumed that load current $i_L$ flows over power semiconductor switches T3 and T4 in the direction of inverter phase 2.

A) Change of Potential at Output Terminal 24 of Inverter Phase 2 from $-U_d/2$ to $+U_d/2$ Over Potential Zero 1) Switching off power semiconductor switch T4:

Since current $i_L$ is flowing in the direction of inverter phase 2, power semiconductor switches T3 and T4 carry current $i_L$. Resonant capacitor $C_{R2}$ is discharged, and resonant capacitor $C_{R1}$ is charged to $+U_d/2$. Power semiconductor switch T4 is switched off first. Load current $i_R$ is commutated to resonant capacitor $C_{R2}$ and begins to charge it. At a sufficiently high load current $i_L$, the voltage can increase rapidly enough. At least at a low load, it is advisable to also use auxiliary circuit 14. The load on auxiliary switch 18 is alleviated through resonant inductor $L_R$ after quenching of power semiconductor switch T4 and therefore it is switched on at no loss. In resonant inductor $L_R$, a positive resonant current $i_R$ is built up due to the addition of ¼, $U_d$ and is superimposed on load current $i_L$ in power semiconductor switch T3 and in resonant capacitor $C_{R2}$ and thus accelerates the polarity reversal process. Resonant current $i_R$ is reduced again as soon as the voltage on resonant capacitor $C_{R2}$ has exceeded the value $U_d/4$. As soon as the voltage on resonant capacitor $C_{R2}$ and thus also the voltage on power semiconductor switch T4 has reached a value of $+U_d/2$, isolating diode D6 begins to conduct. Inverter phase 2 is in the zero state. At this time, resonant current $i_R$ has already dropped again. Load current $i_L$ is now flowing over power semiconductor switch T3 and isolating diode D6. Power semiconductor switch T2 is switched on at no loss. Thus the proper path is created for the case of zero crossing of the current.

2a) Switching off power semiconductor switch T3 (load current $i_L$ retains the same orientation):

Power semiconductor switch T3 is switched off. Current $i_L$ commutates over diode D2 to resonant capacitor $C_{R1}$ which is parallel to power semiconductor switch T1 and is now discharged to zero from potential $+U_d/2$. Here again, auxiliary circuit 14 is connected as needed to accelerate the polarity reversal process. To do so, auxiliary switch 16 can be switched on at no loss. Resonant inductor $L_L$ is magnetized to the voltage $U_{CR1}-¼ U_d$, and in the remaining course of the polarity reversal process it is demagnetized again. The voltage on power semiconductor switch T3 goes to the value $U_d/2$. Thus the potential $U_d/2$ is switched at output terminal 24 of inverter phase 2. Diode D1 receives load current $i_L$. Thus, diodes D1 and D2 are now conducting.

2b) Switching off power semiconductor switch T3 (load current $i_L$ changes polarity):

Due to the zero crossing of current $i_L$, load current $i_L$ is carried over the current path made up by isolating diode D5 and power semiconductor switch T2. The switching process now proceeds in principle exactly as described for connecting $-U_d/2$ to output terminal 24; however, the mirror-image components are involved. First, power semiconductor switch T3 is again switched off. This has no effect, because power semiconductor switch T3 is currentless. Then auxiliary switch 16 is turned on at zero current. Resonant inductor $L_R$ is magnetized to voltage ¼ $U_d$ and then load current $i_L$ commutates to auxiliary circuit 16 and resonant inductor $L_R$. Isolating diode D5 and power semiconductor switch T2 thus become currentless. The diode reverse current from isolating diode D5 leads to overcharging of resonant inductor $L_R$ with additional current ($|I_R|-|I_L|>0$), which is used for accelerated recharging of the capacitor voltage in the manner described above. After chopping of the diode reverse current, this differential current flows over diode D2 into resonant capacitor $C_{R1}$. The voltage on resonant capacitors $C_{R1}$ thus swings from potential $U_d/2$ to zero, so that potential $+U_d/2$ is then applied at output terminal 24 of inverter phase 2. Excess current $i_R-i_L$, which has not yet dropped to zero then flows over diode D1, so that voltage zero is applied at power semiconductor switch T1, which can be switched on at no loss (zero voltage switching). If the diode reverse current is not sufficient to completely discharge resonant capacitor $C_{R1}$, power semiconductor switch T1 must be switched on at the moment of the lowest blocking voltage (approx. 20% of $U_d/2$). The resulting losses due to discharging of resonant capacitor $C_{R1}$ into power semiconductor switch T1 are usually low in comparison with the turn-on losses in traditional switching operations.

The process of switching off power semiconductor switches T1 and T2 takes place by a method similar to the switching off of power semiconductor switches T3 and T4 described above.

B) Change of Phase Output Voltage from Potential +$U_d/2$ to Potential -$U_d/2$ Over Potential Zero 1) Switching off antiparallel-connected diode D1:

Current $i_L$ is flowing at the moment over diodes D1 and D2.

To commutate diodes D1 and D2, load current $i_L$ must be routed into resonant inductor $L_R$. This is initiated by switching on auxiliary switch 16. Resonant current $i_R$ rises above the value of load current $i_L$ until the diode reverse current of diode D1 is chopped. The energy required for polarity reversal is stored in resonant inductor $L_R$ at a sufficiently high diode reverse current. As soon as diode D1 is blocking, resonant capacitor $C_{R1}$ is recharged by the excess current ($i_R$-$i_L$) in resonant inductor $L_R$. Power semiconductor switch T1 takes up voltage $U_d/2$. Resonant inductor $L_R$ is demagnetized against $U_d/4$ over isolating diode D5 and power semiconductor switch T2. During this period of time, power semiconductor switch T3 is switched on at no loss under voltage zero, and load current $i_L$ can then be carried over power semiconductor switch T3, isolating diode D6 and tie point M. If the diode reverse current of diode D1 is not sufficient for a complete reversal of the polarity of the voltage on resonant capacitor $C_{R1}$, power semiconductor switch T3 must be switched on at a residual voltage, resulting in resonant capacitor $C_{R1}$ being discharged to zero more suddenly. However, the resulting energy loss is relatively minor.

2a) Switching potential -$U_d/2$ to output terminal 24 of inverter phase 2 (current has not changed polarity):

For this purpose, power semiconductor switch T2 must first be switched off (currentless, i.e., with no effect). Then auxiliary switch 18 must be switched on, so that load current $i_L$ is commutated to the branch with resonant inductor $L_R$, auxiliary switch 16, -¼ $U_d$. Current $i_R$ in inductor $L_R$ increases until it has reached load current $i_L$ as well as the diode reverse current over isolating diode D6 and thus the energy required for reversal of polarity. At that moment, isolating diode D6 and power semiconductor switch T2 take up voltage (D6 is blocking). At voltage zero, power semiconductor switch T4 is switched on at no loss because diodes D3 and D4 are carrying additional current $i_R$. Resonant inductor $L_R$ is demagnetized against voltage $U_d/4$. If the diode reverse current is too low, active switching on of power semiconductor switch T4 at the voltage minimum is necessary also in this case.

2b) Switching potential -$U_d/2$ to output terminal 24 of inverter phase 2 (current has changed polarity):

Load current $i_L$ is carried over isolating diode D5 and power semiconductor switch T2. The orientation of current $i_L$ is more favorable in this case than with the commutation process after a change in polarity as described above. Switch T2 is switched off, load current $i_L$ is commutated to diode D3 and resonant capacitor $C_{R2}$ which is thus discharged. To accelerate the polarity reversal process, auxiliary switch 18 can be switched on an no loss. An additional current is superimposed on the discharge current of resonant capacitor $C_{R2}$. At voltage zero, power semiconductor switch T4 is switched on at no loss because diodes D3 and D4 are carrying load current $i_L$.

The power inverter described here uses a linear inductor $L_R$ in the resonant circuit. To achieve a short polarity reversal time, inductor $L_R$ must be designed with a low inductance. In the alternative mode of operation, where the reverse current of the diodes is utilized to take up energy for the polarity reversal process, a low inductance is important for yet another reason. The lower the inductance, the greater the rise in current in resonant inductor $L_R$, the greater is also the di/dt of the diode current and the greater is the recovery charge of the diode. If the rate of current rise is too slow, the stored charge in the diode is already partially recombined at zero crossing of the current, so that the recovery charge and thus the initial energy of the polarity reversal process turns out to be too low.

On the other hand, a low inductance is unfavorable for the load on auxiliary switches 16 and 18, which are then subjected to relatively high switching losses.

One remedy is to use a saturable reactor, which has a high inductance at low currents, so that switching losses of auxiliary switches 16 and 18 remain low, and at the same time this ensures steep commutation of the diodes with a sufficiently high recovery charge.

What is claimed is:

1. A low-loss power inverter, comprising:
    a d.c. intermediate circuit having a first tie point and including an upper pair of series-connected capacitors having a second tie point, and a lower pair of series-connected capacitors having a third tie point, the upper pair of series-connected capacitors being connected in series to the lower pair of series connected capacitors, each of the upper pair of series-connected capacitors having substantially equal capacitances and each of the lower pair of series-connected capacitors having substantially equal capacitances;
    at least one isolating diode;
    an inverter phase connected in parallel to the d.c. intermediate circuit and having an output terminal, the inverter phase including an upper bridge half and a lower bridge half, each of the upper bridge half and the lower bridge half including two power semiconductor switches and two diodes, each of the two diodes of each of the upper bridge half and the lower bridge half being antiparallel-connected to one of the two power semiconductor switches, the two semiconductor switches of each of the upper bridge half and the lower bridge half having a fourth tie point, the fourth tie point being coupled to the first tie point via one of the at least one isolating diode;
    an auxiliary circuit including an upper auxiliary switch, a lower auxiliary switch, and a resonant inductor, each of the upper auxiliary switch and the lower auxiliary switch being connected in series to the resonant inductor, the auxiliary circuit coupling the second tie point and the third tie point to the output terminal; and
    at least one resonant capacitor coupled to the inverter phase.

2. The low-loss power inverter according to claim 1, wherein the first tie point is positioned between the upper pair of series-connected capacitors and the lower pair of series connected capacitors, the second tie point is positioned between the upper pair of series-connected capacitors, the third tie point is positioned between the lower pair of series-connected capacitor, and the and the fourth tie point is positioned between the two semiconductor switches of each of the upper bridge half and the lower bridge half.

3. The low-loss power inverter according to claim 1, wherein the at least one resonant capacitor includes at least two resonant capacitors, one of the at least two resonant capacitors being connected in parallel to one of the two power semiconductor switches of the upper bridge half, and another one of the at least two resonant capacitors being connected in parallel to one of the two power semiconductor switches of the lower bridge half.

4. The low-loss power inverter according to claim 3, wherein the at least one resonant capacitor includes at least two resonant capacitors, wherein a first one of the at least two resonant capacitors is connected in parallel to the two power semiconductor switches of the upper bridge half, the two power semiconductor switches of the upper bridge half being connected to each other in series, and wherein a second one of the at least two resonant capacitors is connected in parallel to the two power semiconductor switches of the lower bridge half, the two power semiconductor switches of the lower bridge half being connected in series to each other.

5. The low-loss power inverter according to claim 3, wherein the at least one resonant capacitor includes at least four resonant capacitors, and wherein the two power semiconductor switches of the upper bridge half are connected to each other in series and a first one of the two power semiconductor switches of the upper bridge half is connected in parallel to a first one of the at least four resonant capacitors, and a second one of the two power semiconductor switches of the upper bridge half is connected in parallel to a second one of the at least four resonant capacitors, and wherein the two power semiconductor switches of the lower bridge half are connected to each other in series and a first one of the two power semiconductor switches of the lower bridge half is connected in parallel to a third one of the at least four resonant capacitors, and a second one of the two power semiconductor switches of the upper bridge half is connected in parallel to a fourth one of the at least four resonant capacitors.

6. The low-loss power inverter according to claim 1, wherein the at least one resonant capacitor includes at least two resonant capacitors, and wherein a first one of the at least two resonant capacitors is connected between the fourth tie point of the upper bridge half and the first tie point, and a second one of the at least two resonant capacitors is connected between the fourth tie point of the lower bridge half and the first tie point.

7. The low-loss power inverter according to claim 1, wherein one of the at least one resonant capacitor is connected between the output terminal and the first tie point.

8. The low-loss power inverter according to claim 1, wherein the at least one resonant capacitor includes at least two resonant capacitors, and wherein a first one of the at least two resonant capacitors is connected in parallel to the upper bridge half and a second one of the at least two resonant capacitors is connected in parallel to the lower bridge half.

9. The low-loss power inverter of claim 1, wherein the at least one resonant capacitor includes at least four resonant capacitors, wherein a first one of the at least four resonant capacitors is connected in parallel to one of the two power semiconductor switches of the upper bridge half, a second one of the at least four resonant capacitors is connected in parallel to one of the two power semiconductor switches of the lower bridge half, a third one of the at least four resonant capacitors is connected between the fourth tie point of the upper bridge half and the first tie point, and a fourth one of the at least four resonant capacitors is connected between the fourth tie point of the lower bridge half and the first tie point.

10. The low-loss power inverter of claim 1, wherein the at least one resonant capacitor includes at least three resonant capacitors, and wherein a first one of the at least three resonant capacitors is connected in parallel to one of the two power semiconductor switches of the upper bridge half, a second one of the at least two resonant capacitors is connected in parallel to one of the two power semiconductor switches of the lower bridge half, and a third one of the at least three resonant capacitors is connected between the output terminal and the first tie point.

11. The low-loss power inverter of claim 1, wherein the at least one resonant capacitor includes at least five resonant capacitors, wherein a first one of the at least five resonant capacitors is connected in parallel to one of the two power semiconductor switches of the upper bridge half, a second one of the at least five resonant capacitors is connected in parallel to one of the two power semiconductor switches of the lower bridge half, a third one of the at least five resonant capacitors is connected between the fourth tie point of the upper bridge half and the first tie point, a fourth one of the at least five resonant capacitors is connected between the fourth tie point of the lower bridge half and the first tie point, and a fifth one of the at least five resonant capacitors is connected between the output terminal and the first tie point.

12. The low-loss power inverter of claim 1, wherein each of the two power semiconductor switches of the upper bridge half and each of the two power semiconductor switches of the lower bridge half includes a switched power semiconductor switch.

13. The low-loss power inverter of claim 1, wherein each of the upper auxiliary switch and the lower auxiliary switch includes two series-connected auxiliary semiconductor switches and two auxiliary diodes, each of the two auxiliary diodes being antiparallel-connected to one of the two series-connected auxiliary semiconductor switches, each of the two series-connected auxiliary semiconductor switches having a cathode, the cathode of a first one of the two series-connected auxiliary switches being connected to the cathode of a second one of the two series-connected auxiliary switches.

14. The low-loss power inverter of claim 13, wherein each of the two series-connected auxiliary semiconductor switches of each of the upper auxiliary switch and the lower auxiliary switch includes a high-power converter.

15. The low-loss power inverter according to claim 1, wherein the resonant inductor is a saturable reactor.

16. The low-loss power inverter according to claim 1, wherein the least one resonant capacitor includes at least two resonant capacitors, and wherein the at least one isolating diode includes two series-connected diodes, and a first one of the at least two isolating diodes being connected in parallel to a first one of the at least two resonant capacitors, and a second one of the at least two isolating diodes being connected in parallel to a second one of the at least two resonant capacitors.

17. A low-loss power inverter, comprising:
   a d.c. intermediate circuit having a first tie point and including an upper pair of series-connected capacitors having a second tie point, and a lower pair of series-connected capacitors having a third tie point, the upper pair of series-connected capacitors being connected in series to the lower pair of series connected capacitors, the upper pair of series-connected capacitors having substantially equal capacitances and the lower pair of series-connected capacitors having substantially equal capacitances;

at least one isolating diode;

an inverter phase connected in parallel to the d.c. intermediate circuit and having an output terminal, the inverter phase including an upper bridge half and a lower bridge half, each of the upper bridge half and the lower bridge half including two power semiconductor switches and two diodes, each of the two diodes of each of the upper bridge half and the lower bridge half being antiparallel-connected to one of the two power semiconductor switches, the two semiconductor switches of each of the upper bridge half and the lower bridge half having a fourth tie point, the fourth tie point being coupled to the first tie point via one of the at least one isolating diodes; and an auxiliary circuit including an upper auxiliary switch, a lower auxiliary switch, and two resonant inductors, each of the upper auxiliary switch and the lower auxiliary switch being connected in series to one of the two resonant inductors, the auxiliary circuit coupling the second tie point and the third tie point to the output terminal; and at least one resonant capacitor coupled to the inverter phase.

* * * * *